(No Model.)
C. S. TREVITT & S. F. MOUCK.
BARBED FENCE.
No. 404,879. Patented June 11, 1889.
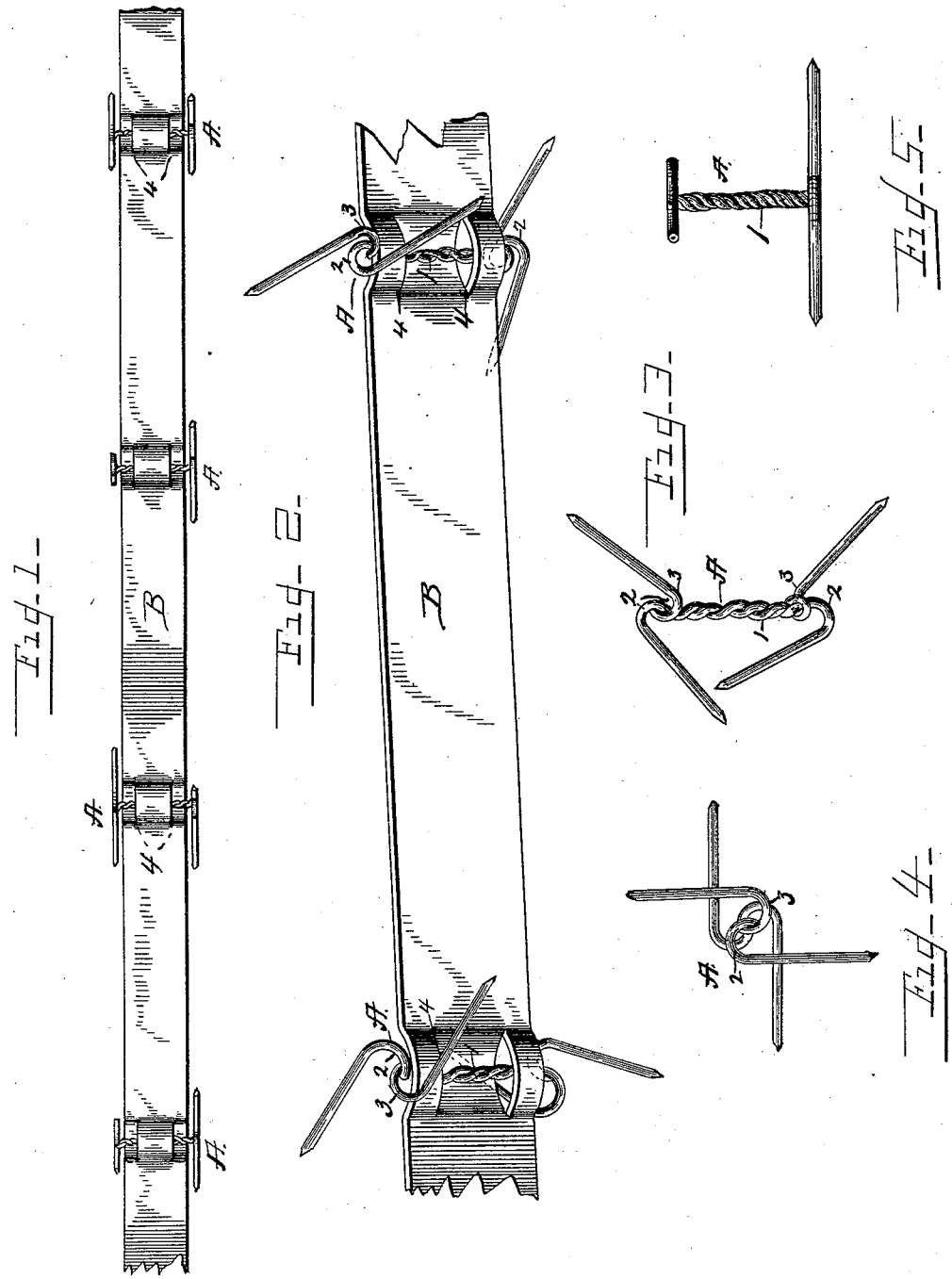
Witnesses
G. A. Fauberschmidt,
E. C. Walkas.
Inventors
Constant S. Trevitt
Solomon F. Mouck
By their Attorney
A. G. Heylman.

UNITED STATES PATENT OFFICE.

CONSTANT S. TREVITT AND SOLOMON F. MOUCK, OF LINCOLN, NEBRASKA.

BARBED FENCE.

SPECIFICATION forming part of Letters Patent No. 404,879, dated June 11, 1889.

Application filed January 28, 1889. Serial No. 297,797. (No model.)

*To all whom it may concern:*

Be it known that we, CONSTANT S. TREVITT and SOLOMON F. MOUCK, citizens of the United States of America, residing at Lincoln, in the county of Lancaster and State of Nebraska, have invented certain new and useful Improvements in Barbed Fences, of which the following is a specification.

Our invention relates to improvements in barbed fences, and the object is to provide a barb for a fence which will not lacerate or severely injure the animal coming in contact therewith; and with this object in view our invention consists in a barb formed with a vertical axis and having the barbs curved at their junction with the axis to form surface-bearings, and then struck at substantially right angles to the axis in opposite directions on a horizontal plane, as hereinafter specified. The ordinary barbs grasped by the strands or strips of the fence, because of their rigid connections, do not yield sufficiently to prevent the wounding or laceration of the animal. This we overcome by arranging the stem or shank of the barb in a vertical bearing with the curved parts of the barbs to loosely rest on the edges of the supporting fence-strip, so as to freely rotate on the axis and curved surface bearings when the barbs are pressed against from side direction, resulting in giving animals all necessary warning without unnecessary injury.

We have fully illustrated our invention in the accompanying drawings, wherein—

Figure 1 is a side view of a strip or strand of fence having our improved barbs inserted. Fig. 2 is a perspective of the barbs connected to a strip or strand of fence. Fig. 3 is a perspective of the barb detached from the fence. Fig. 4 is a top plan view of the barb. Fig. 5 is a side view of the barb.

Referring to the drawings, A designates the barb, composed of two wires twisted together, as at 1, to form a shank or axis. At the terminations of the twisted shank the wires are struck down to horizontality, curved in opposite directions, as at 2 3, and from the curves the barbs or points are directed substantially as shown, the barbs at the respective ends of the shank being arranged substantially at right angles to each other, as seen in Fig. 4 of the drawings. The shank serves as an axis on which the barb turns when arranged in its bearings, and the curved parts constitute surface bearings on the edges of the strips of the fence.

B designates the fence strip or strand. This strand is formed at determined distances with slits 4, the parts of which are formed in bearings for the barbs, the shanks of the barbs being arranged in these formed bearings, as shown in Figs. 1 and 2 of the drawings. These strips are secured with their flat sides to the posts or supports, which arrangement of the strips brings the axis of the barbs in a vertical direction, so as to rotate whenever an object presses against or contacts with them.

The standard or shank of the barb may be of two or more wires twisted together with their ends formed and terminating as heretofore described, or the parts may be of one wire or rod of sufficient size to be split at each end, and the split parts curved to form the surface bearings and then struck outward to form the barbs.

The points of the barbs should be so bent that the two on one end shall point or stand in different directions from those on the opposite end, so that one barb or point at least shall at all times extend outward from each side of the fence-strip.

Having thus described our improvements and the mode of applying the same so as to distinguish them from other inventions, we proceed to particularly point out distinctly what we claim to be our invention, as follows:

1. The improved fence-barb herein described, formed with an axial bearing 1, curved surface bearings 2 3 at each end of the axis, arranged on planes at right angles to the axis, and terminating in barbs struck at right angles to each other, substantially as described.

2. The improved fence-barb A, consisting of two wires twisted together to form an axial bearing 1, the four ends of the wires being formed into curved bearing-surfaces 2 3, arranged on planes at right angles to the axis and terminating in barbs arranged at right angles to each other, substantially as described.

3. The combination, with the strands formed with vertical bearings, of barbs composed of wires having a twisted shank constituting a bearing or axis, curved surface bearings at the end of the shank, and terminating in barbs arranged at right angles to each other, substantially as specified.

In witness whereof we have hereunto set our hands in the presence of two attesting witnesses.

CONSTANT S. TREVITT.
    SOLOMON F. MOUCK.

Attest as to Constant S. Trevitt:
 A. G. HEYLMUN,
 E. C. DALLAS.

Attest as to S. F. Mouck:
 S. LOUIS WILLSON,
 W. E. BAILIES.